United States Patent [19]
Huguet

[11] Patent Number: 5,928,758
[45] Date of Patent: Jul. 27, 1999

[54] BLANKS FOR MICROFILM INSERTIONS

[76] Inventor: Rafael R. Huguet, 37 NW. 40 Ct., Miami, Fla. 33126

[21] Appl. No.: 09/079,294

[22] Filed: May 15, 1998

[51] Int. Cl.[6] .............................. B42D 15/10; B32B 3/24
[52] U.S. Cl. ......................... 428/138; 428/137; 428/131; 428/136; 40/703; 40/709; 353/120; 283/76
[58] Field of Search .................................. 428/137, 138, 428/131, 136; 40/703, 709; 353/120; 283/76

[56] References Cited

U.S. PATENT DOCUMENTS

| | | | |
|---|---|---|---|
| 2,926,443 | 3/1960 | Rinn | 40/152 |
| 3,478,456 | 11/1969 | Mundt | 40/152 |
| 3,491,471 | 1/1970 | Semple | 40/152 |
| 3,792,542 | 2/1974 | Cohan | 40/212 |
| 3,810,566 | 5/1974 | Adams et al. | 40/104.18 |
| 4,236,332 | 12/1980 | Domo | 40/2.2 |
| 4,318,554 | 3/1982 | Anderson et al. | 283/7 |
| 4,607,442 | 8/1986 | Desmarais et al. | 40/152 |
| 4,619,469 | 10/1986 | Grover | 283/76 |
| 4,632,428 | 12/1986 | Brown | 283/76 |
| 4,884,885 | 12/1989 | Schweinsberg | 353/120 |
| 4,988,556 | 1/1991 | Nilsen et al. | 428/195 |

Primary Examiner—William P. Watkins, III
Attorney, Agent, or Firm—J. Sanchelima

[57] ABSTRACT

A card blank for identification cards and the like that include a microfilm with predetermined information to be read by a common utensil such as a magnifying glass or a microscope. The card includes two sheets that joined together at predetermined areas and include each a window with similar dimensions and in alignment. The microfilm is positioned between the two sheets exposing most of its area with information. The edges of the microfilm are sandwiched by the two sheets defining a peripheral wall around the windows. One of the embodiments contemplates the use of a slot in one of the sheets with a peripheral pocket surrounding the windows. This allows the ready insertion of the microfilm. Another embodiment includes a flexible second sheet that folds back permitting a user to bring one straight edge of the microfilm in abutting contact with an interface line thereby readily positioning the microfilm so that a substantial portion of its information is exposed. A lamination film is subsequently placed over the sheets to protect the microfilm.

14 Claims, 3 Drawing Sheets

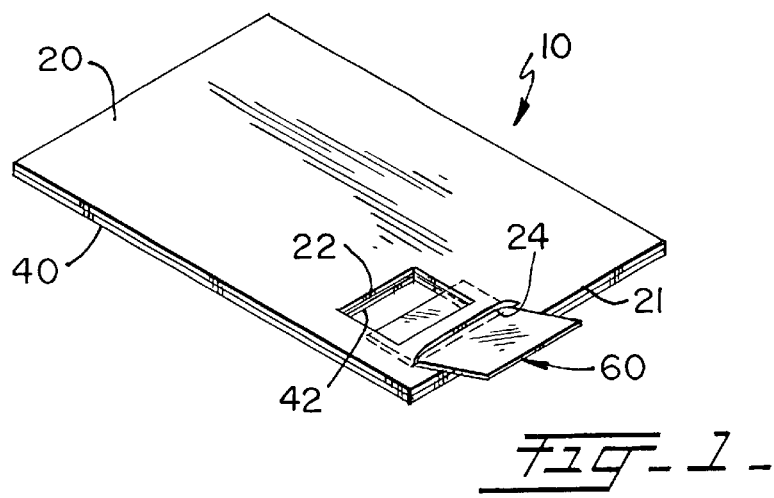
FIG-1-
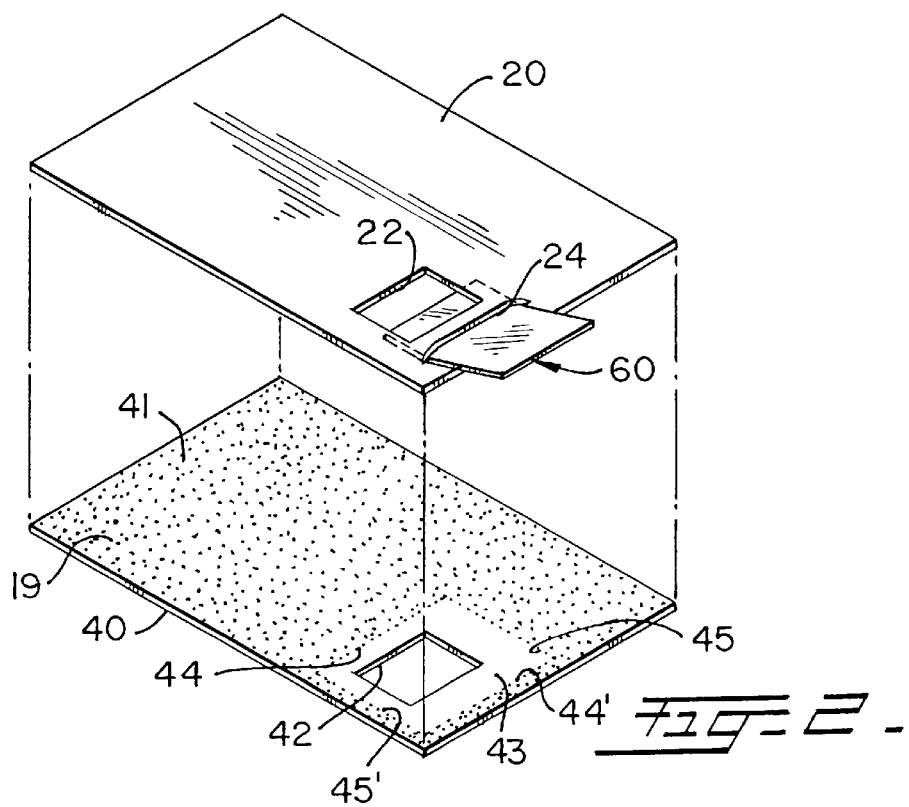
FIG-2-
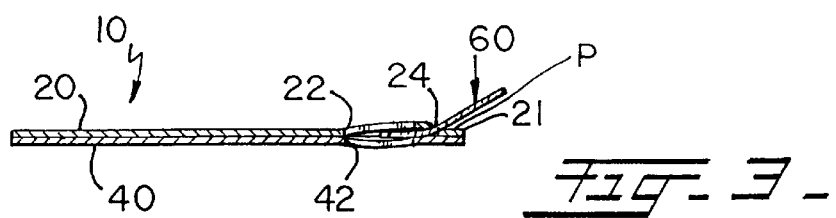
FIG-3-

BLANKS FOR MICROFILM INSERTIONS

BACKGROUND OF THE INVENTION

1. Field of the Invention

The present invention relates to a blank that permits the insertion and viewing of microfilms containing information, and more particularly, to the type that is commonly used for credentials, and identification cards.

2. Description of the Related Art

Blanks or cards carrying a microfilm exist nowadays, however the typical blank or card requires two superimposed thin layers of cellophane or similar transparent plastic films to form pouch or jacket adhered thereto in order to store the microfilm. When identification cards include microfilm, it is desirable to make the information sufficiently large and clear to permit a user to easily read significant data using a common tool, such as a magnifying glass, or an inexpensive 3x loupe. It was found that reading information contained in the microfilm aided with a common magnifying glass is distorted since the surface of the superimposed thin layers of cellophane pouch or jacket develops wrinkles and air bubbles when further laminated with a heavy gauge plastic for protection. Furthermore, a limitation in the prior art processes, is that the thin layers of cellophane or plastic films defining the pouch or jacket must be adhered to the blank or card after all printed matter has been set thereon, otherwise the printed ink will fade away at surface covered by the cellophane due to different texture in material. In addition, the edges of the thin layers of cellophane or plastic films under the final lamination can be seen detracting from the aesthetical appearance of the card. The present invention overcomes these shortcomings permitting the insertion of the microfilm directly in the pocket created by the two sheets comprising the blank or card. The information contained in the microfilm is directly exposed through a pre-cut window of smaller dimensions than the microfilm after insertion of the microfilm through peripheral pockets or pouches around a window of predetermined dimensions and created as an integral part of the two sheet assemblies. Also, a laminated cover is used to protect the microfilm, thus providing a flat and clear surface to read the information with a magnifying glass without distortions.

SUMMARY OF THE INVENTION

It is one of the main objects of the present invention to provide a blank or card that permits the readily insertion of identification articles, such as microfilms, with maximum protection and minimum optical distortion.

It is still another object of the present invention to provide a blank or card that after the insertion of the microfilm, a user is able to read the contained information with a magnifying glass without difficulty.

It is yet another object of this invention to provide such a blank that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is an isometric view from the top of the present invention, showing a microfilm being inserted inside the blank.

FIG. 2 is an exploded isometric view from the top of this invention.

FIG. 3 is an elevational side cross-sectional view of the invention shown in the previous figures.

DETAILED DESCRIPTION OF THE PREFERRED EMBODIMENT

Figure 4:
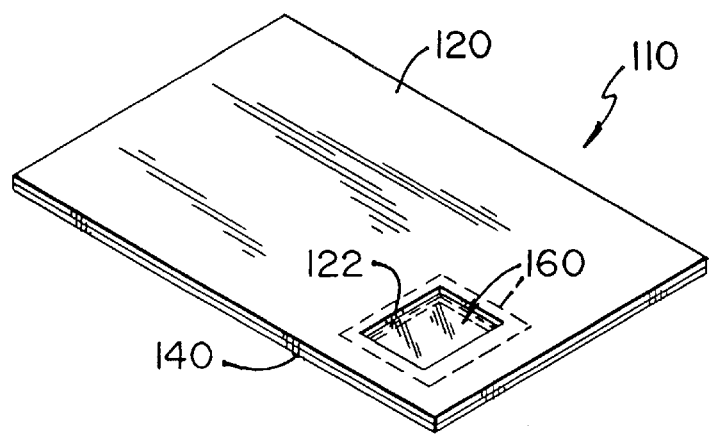
FIG. 4 is an isometric view from the top of an alternate embodiment.

Referring now to the drawings, where the present invention is generally referred to with numeral 10, it can be observed that it basically includes blank sheets 20 and 40 adhered to each other and each having pre-cut windows 22 and 42, respectively. Microfilm 60 is exposed through windows 22 and 42. The resulting blank card 10 may contain pre-printed information and/or it can be subsequently added. Microfilm 60 may contain a substantial amount of information, such as medical history, student's records, etc., depending on the application. A user can read and/or interpret the microfilm information using a common object such as a magnifying glass, low power microscope, etc., and thus making the information readily available.

Blank card 10, in the preferred embodiment, has blank sheets 20 and 40 that are adhered to each other with adhesive material 19 at predetermined areas. Sheet 40, has portion 41 defined by the location of adhesive material 19 and portion 43 without adhesive material. Portion 43 is peripherally defined around window 42 with interface lines 44; 44'; 45 and 45' defining an area with dimensions larger than window 42, as best seen in FIG. 2. When sheets 20 and 40 are brought together in cooperative alignment, a pocket or pouch is peripherally defined around windows 22 and 42. In this manner, microfilm 60 can be readily inserted without any obstruction by adhesive material 19. Sheet 20 includes pre-cut slot 24 relatively close to window 22. In the preferred embodiment, slot 24 is positioned between peripheral edge 21 of sheet 20 and the closest side of rectangular window 22, as illustrated in FIGS. 1; 2 and 3. Slot 24 has cooperative dimensions to permit preselected microfilm 60 to go through. When a user applies pressure between slot 24 and edge 21 of card 10, in area "P", the opening of slot 24 opens slightly facilitating the insertion of microfilm 60, as illustrated in FIG. 3. As described above, microfilm 60 is kept in place between sheets 20 and 40, and it is exposed through windows 22 and 42. Microfilm 60 is inserted through slot 24 until the leading edge of the former finds interface line 44 delineating the boundaries of portions 41 and 43. Sheets 20 and 40 have a rectangular shape, in the preferred embodiment, which makes them particularly suitable for high production processing.

Figure 5:
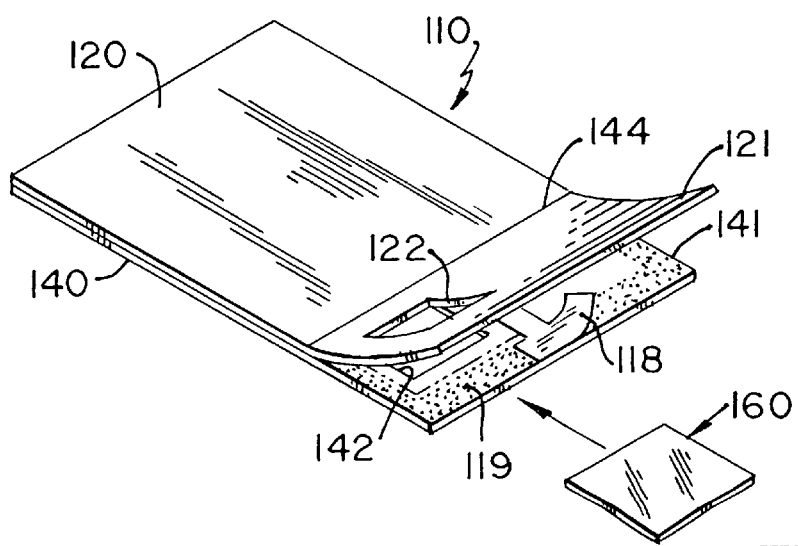
FIG. 5 is an isometric view from the top, showing the method of insertion of a microfilm inside the blank or card. An adhesive tape is partially shown as it is being peeled off.

FIGS. 4; 5 and 6 show alternate embodiment 110. Blank 110 includes sheets 120 and 140 adhered to each other and having portions 121 and 141, respectively, as best seen in FIG. 5. The rest of sheets 120 and 140 are joined together defining an interface hinge line 144. Similar to blank 10, sheets 120 and 140 include pre-cut windows 122 and 142, respectively, which are symmetrical and located in cooperative alignment with each other. Portion 141 of sheet 140 has adhesive material 119 except in the peripheral surface adjacent to window 142. Tape 118 prevents the adhesive material 119 from coming in contact with the inner surface of portion 121. Pre-selected microfilm 160 is inserted between portions 121 and 141 and in alignment with windows 122 and 142. Microfilm 160 is inserted until its leading edge finds hinge line 144. Then, tape 118 is peeled off, portions 121 and 141 are brought together and kept there by pressure sensitive adhesive material 119. In this manner, microfilm 160 is trapped between sheets 120 and 140, exposing the information it contains.

Figure 6:
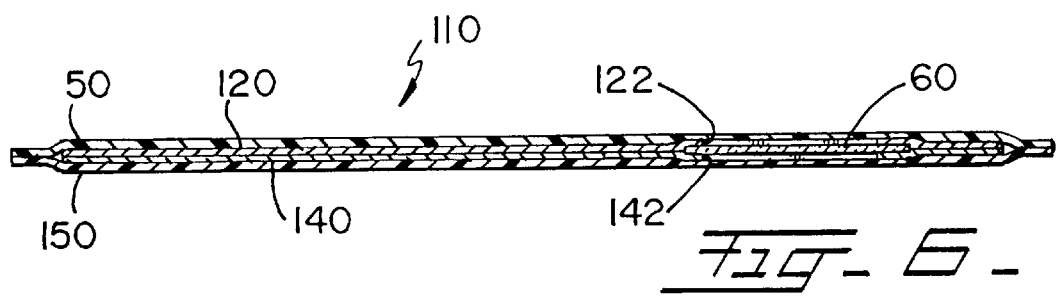
FIG. 6 is an elevational side cross sectional view of the embodiment illustrated in FIGS. 4 and 5, showing the blank with the microfilm sandwiched by two laminating sheets.

Sheets 120 and 140 of blank 110 may be made out of a carton or paper like material, with sufficient flexibility to permit its ready manipulation and folding of sheet portion 121. After microfilms 60 and 160 are inserted inside blanks 10 and 110, respectively, a laminated process is recommended for the physical protection of the entire card and the microfilm. As illustrated in FIG. 6, blank 110 is covered with laminating sheets 50 and 150.

Figure 7:
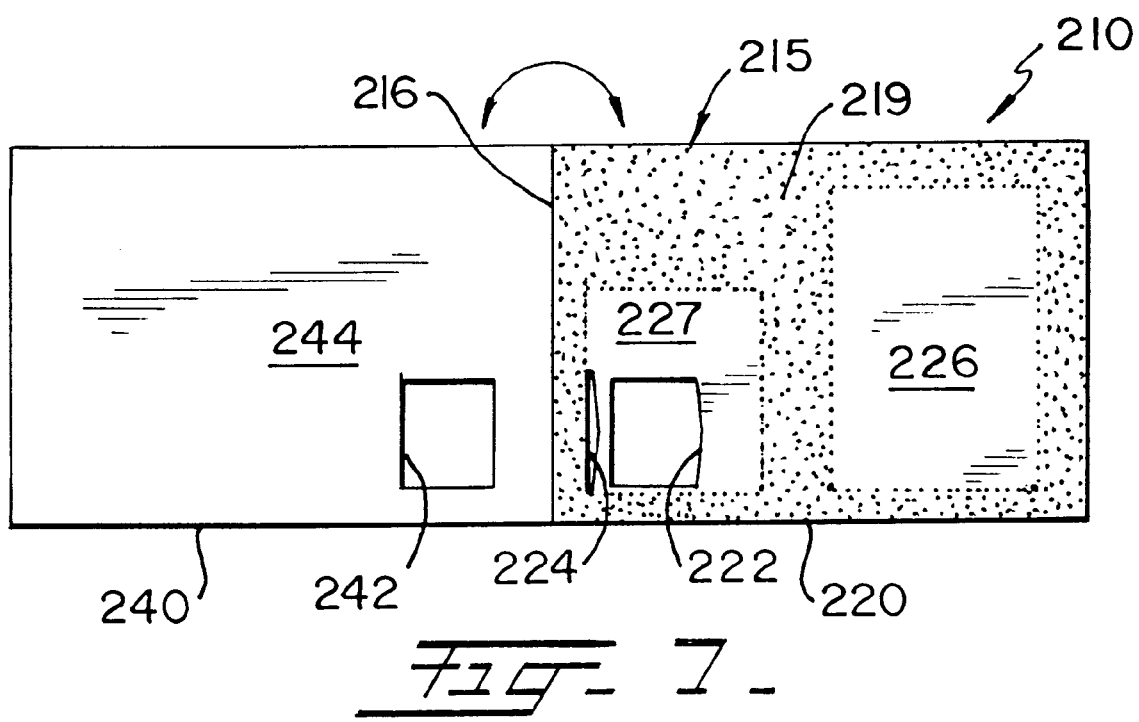
FIG. 7 is a top view of another alternate embodiment before folded.

FIG. 7 shows second alternate embodiment 210. Blank 210 basically comprises sheet 215 with folding line 216 defining portions 220 and 240. Portion 220 includes pre-cut window 222 and slot 224 adjacent to each other. Portion 220 has adhesive material 219 located in predetermined areas and defining areas 226 and 227. Area 226 is optionally left without adhesive if desired in order to avoid extra costs. Once sheet 215 is folded along folding line 216, portions 220 and 240 are brought and kept together with adhesive material 219. Pre-cut window 242 of portion 240 is in alignment with pre-cut window 222 of portion 220. Similar to blank 10, a microfilm is inserted through slot 224 and housed inside the pouch or jacket created between section 227 and surface 244.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A blank card, comprising:
A) a first sheet member having a first inner surface and a first outer surface and a first pre-cut window;
B) a second sheet member having a second inner surface and a second outer surface, and a second pre-cut window, and further including adhesive means for joining said first and second inner surfaces to each other at predetermined areas except first and second portions on said first and second inner surfaces, respectively, defining interface lines adjacent to said first and second pre-cut windows, said first and second pre-cut windows being in cooperative alignment with each other and being located within said first and second portions, respectively, and said second sheet member further including a slot positioned relatively close to said second window wherein said first and second portions lack said adhesive means and are coplanarly disposed with respect to said first and second inner surface respectively so that a peripheral pocket is defined around said first and second pre-cut windows; and
C) a microfilm sheet, having a peripheral edge, insertable within said slot and having cooperative dimensions that are larger than said first and second windows so that when positioned within said first and second sheet members a substantial portion of said microfilm is exposed through said windows and the rest of said microfilm is sandwiched between said first and second sheet members inside said peripheral pocket.

2. The blank card set forth in claim 1 wherein said first and second windows have a substantially rectangular shape with first, second, third and fourth sides, and said slot being positioned at a spaced apart and parallel relationship with respect to said first side.

3. The blank card set forth in claim 2 wherein said peripheral pocket has a substantially similar and larger dimensions than said windows defining an interface line and said microfilm having similar and larger rectangular dimensions than said windows and smaller than said peripheral pocket, and said microfilm and peripheral pocket also being defined, respectively, by first, second, third and fourth sides, so that when inserted through said slot, said first side of said microfilm is abutting the side of said peripheral pocket that is the farthest away from said slot.

4. The blank card set forth in claim 3 wherein the dimensions of said peripheral pocket, said microfilm and said first and second windows is preselected to permit a predetermined portion of said microfilm to be exposed when said first side of the microfilm comes in abutment contact with said side of the peripheral pocket that is the farthest away from said slot.

5. The blank card set forth in claim 4 further including:
D) a lamination film covering at least said microfilm exposed through said first and second windows.

6. The blank card set forth in claim 1 wherein said first and second sheet members are symmetrical and include each first and second ends, said first ends being integrally joined together.

7. A blank card, comprising:
A) a first sheet member having a first inner surface and a first outer surface and a first pre-cut window;
B) a second sheet member having flexibility characteristics, a second inner surface and a second outer surface, and a second pre-cut window, and further including adhesive means for joining said first and second inner surfaces to each other at predetermined areas except first and second portions on said first and second inner surfaces, respectively, defining interface lines adjacent to said second pre-cut window, said first and second pre-cut windows being in cooperative alignment with each other and located in said first and second portions, respectively, wherein said first and second portions lack said adhesive means and are coplanarly disposed with respect to said first and second inner surface, respectively so that a peripheral pocket is defined around said first and second pre-cut windows; and
C) a microfilm sheet, having a peripheral edge with at least one straight edge and having cooperative dimensions that are larger than said first and second windows so that when positioned within said first and second sheet members with said straight edge abutting against said interface line a substantial portion of said microfilm is exposed through said windows and the rest of said microfilm is sandwiched between said first and second sheet members inside said peripheral pocket.

8. The blank card set forth in claim 7 wherein said first and second windows have a substantially rectangular shape with first, second, third and fourth sides.

9. The blank card set forth in claim 8 wherein the dimensions of said microfilm and said first and second windows is preselected to permit a predetermined portion of said microfilm to be exposed when said first side of the microfilm comes in abutment contact with said interface line.

10. The blank card set forth in claim 9 further including:
E) a lamination film covering at least said microfilm exposed through said first and second windows.

11. The blank card set forth in claim 10 wherein said first and second sheet members have a substantially rectangular shape with four sides each and one of the sides of said first and second sheet being commonly shared making said first and second sheet an integral unit.

12. The blank card set forth in claim 11 wherein said first and second windows have a substantially rectangular shape with first, second, third and fourth sides.

13. The blank card set forth in claim 12 wherein said peripheral pocket has a substantially similar and larger dimensions than said windows defining an interface line and said microfilm having similar and larger rectangular dimensions than said windows and smaller than said peripheral pocket, and said microfilm and peripheral pocket also being defined, respectively, by first, second, third and fourth sides.

14. The blank card set forth in claim 13 wherein the dimensions of said peripheral pocket, said microfilm and said first and second windows is preselected to permit a predetermined portion of said microfilm to be exposed when said first side of the microfilm comes in abutment contact with said first side of the peripheral pocket.

* * * * *